(12) United States Patent
Giger et al.

(10) Patent No.: US 6,890,380 B2
(45) Date of Patent: May 10, 2005

(54) CONDITIONING OF ORGANIC PIGMENTS

(75) Inventors: Gerhard Giger, Muttenz (CH); Jürgen Beyrich, Huttingen (DE); Philippe Bugnon, Essert (CH); Marc Maurer, Village-Neuf (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/466,463

(22) PCT Filed: Jan. 31, 2002

(86) PCT No.: PCT/EP02/01018

§ 371 (c)(1),
(2), (4) Date: Jul. 15, 2003

(87) PCT Pub. No.: WO02/068541

PCT Pub. Date: Sep. 6, 2002

(65) Prior Publication Data

US 2004/0050298 A1 Mar. 18, 2004

(30) Foreign Application Priority Data

Feb. 8, 2001 (CH) .............................. 0234/01

(51) Int. Cl.⁷ .................... C09B 67/04; C09B 67/10; C08K 5/00; C08K 5/3415
(52) U.S. Cl. .............. 106/493; 106/412; 106/494; 106/495; 106/496; 106/497; 106/498; 106/499
(58) Field of Search ................. 106/412, 493, 106/494, 495, 496, 497, 498, 499, 413

(56) References Cited

U.S. PATENT DOCUMENTS

| | | | |
|---|---|---|---|
| 2,857,400 A | 10/1958 | Cooper | 260/246 |
| 3,017,414 A | 1/1962 | Minnich et al. | 260/279 |
| 3,256,285 A | 6/1966 | Fuchs et al. | 260/279 |
| 3,287,147 A | 11/1966 | Wilkinson | 106/288 |
| 3,615,800 A | 10/1971 | Spietschka et al. | 106/228 |
| 4,024,148 A | 5/1977 | Tyson et al. | 260/279 |
| 4,094,699 A | 6/1978 | Fitzgerald | 106/495 |
| 4,247,696 A | 1/1981 | Shibata et al. | 546/49 |
| 4,431,806 A | 2/1984 | Spietschka et al. | 546/37 |
| 4,522,654 A | 6/1985 | Chisvette et al. | 106/288 |
| 4,541,872 A | 9/1985 | Jaffe | 106/309 |
| 4,734,137 A | 3/1988 | Kasahara et al. | 106/308 |
| 4,895,948 A | 1/1990 | Jaffe et al. | 546/56 |
| 4,895,949 A | 1/1990 | Jaffe et al. | 546/56 |
| 4,922,101 A | 5/1990 | Hashiue | 250/327.2 |
| 5,264,034 A | 11/1993 | Dietz et al. | 106/493 |
| 5,318,627 A | 6/1994 | Dietz et al. | 106/498 |
| 5,428,136 A | 6/1995 | Jung et al. | 534/741 |
| 5,492,563 A | 2/1996 | Urban | 106/412 |
| 5,565,578 A | 10/1996 | Bäbler | 548/453 |
| 5,614,014 A | 3/1997 | Urban | 106/495 |
| 5,756,691 A | 5/1998 | Weber et al. | 534/742 |
| 5,800,607 A | 9/1998 | Schnaitmann et al. | 106/412 |
| 6,174,361 B1 | 1/2001 | Urban et al. | 106/498 |
| 6,191,263 B1 | 2/2001 | Schmidt et al. | 534/575 |
| 6,241,814 B1 | 6/2001 | Urban et al. | 106/497 |

FOREIGN PATENT DOCUMENTS

| | | |
|---|---|---|
| DE | 3446177 | 7/1985 |
| DE | 19618056 | 1/1997 |
| EP | 0504923 | 9/1992 |
| EP | 0524904 | 1/1993 |
| EP | 0678558 | 10/1995 |
| EP | 0737723 | 10/1996 |
| EP | 0979846 | 2/2000 |
| WO | 99/54410 | 10/1999 |
| WO | 01/04215 | 1/2001 |

OTHER PUBLICATIONS

English Abstract of JP 54130621 (Oct. 1979).
English Abstract of JP 58147461 (Sep. 1983).

Primary Examiner—Anthony J. Green
(74) Attorney, Agent, or Firm—Kevin T. Mansfield; Shiela A. Loggins

(57) ABSTRACT

Organic pigments are conditioned by treating them, after synthesis but preferably without or with only partial drying, in a mixture of from 1 to 30% by weight of a neutral, polar liquid having a dipole moment $\mu$ of 2.8–6.0? $10^{-18}$ esu (2.8 to 6.0 debye units) and from 70 to 99% by weight of water in an agitated media pearl mill having a specific power density of at most 2.0 $kJ^{s?-1}$ per liter of grinding space. Drying is especially suitable in the case of only slightly agglomerating, easy to wet pigments of specific surface area from 1 to 25 $m^2/g$. The method gives excellent results, and is flexible and also much simpler than known methods.

34 Claims, No Drawings

CONDITIONING OF ORGANIC PIGMENTS

The invention relates to a simplified, economical and environmentally friendly method of conditioning organic, especially polycyclic pigments and diketopyrrolopyrroles. The coloristic properties of the pigments obtained are significantly better than in the case of existing simple methods and as good as in the case of known methods that are more complicated, more costly, or problematic.

Pigments are generally obtained from synthesis in a form that is not suited, or is only poorly suited, to most applications. It is therefore customary for the crude pigments to be subjected to conditioning. In the course of time it has also been found that most conditioning methods are highly specific and can be used only for individual pigment classes or even only for individual pigments, giving rise, therefore, to virtually countless methods, which have been disclosed in an extremely large number of patent applications and patents.

In such methods, the same basic principles are always applied: the crude pigments are dissolved and re-precipitated from the solution, ground (where appropriate, with the aid of grinding elements), or treated with water or solvents (where appropriate, at elevated temperature). Generally, however, the methods are combined with one another and, where appropriate, supplemented by additional process measures having different purposes, for example the addition of acids, bases and/or additives, giving rise to the many known variants.

In particular, the patents and patent applications which are considered hereinbelow appear representative of those existing methods.

In U.S. Pat. No. 2,857,400 and U.S. Pat. No. 3,017,414, pigments are firstly dry-ground and then stirred vigorously in a solvent (including dimethylformamide) or in an emulsion consisting of water and a non-polar solvent. U.S. Pat. No. 4,431,806 uses, inter alia, N-methylpyrrolidone, with addition of water and heating to 50° C. being carried out before filtering. From EP-A-0 524 904 and U.S. Pat. No. 5,264,034, it is apparent that, for aftertreatment of previously ground crude products, polar solvents, including especially dimethyl sulfoxide and N-methylpyrrolidone, are suitable at temperatures of up to about 50° C. as suspension media also for further pigment classes.

The procedure in U.S. Pat. No. 5,492,563, for phthalocyanines, is also a two-stage procedure wherein, after the necessary comminution by means of dry grinding (with addition of wax), the aftertreatment is carried out in water together with up to 5% of an organic solvent. Polar solvents are also disclosed, methyl ethyl ketone being used in one example. In contrast, in Example 3 of U.S. Pat. No. 5,614,014, coarse-grained, unsubstituted γ-quinacridone is, without prior comminution, ground in 10% dimethylformamide with application of a high force and at a high radial speed at 25° C., but, undesirably, opacity is not achieved without aftertreatment (finishing) as in Example 9. According to U.S. Pat. No. 4,094,699, in the case of quinacridones, organic liquids need not be used during wet grinding if a wetting agent together with a strongly alkaline aqueous solution is used.

In U.S. Pat. No. 3,615,800, perylenes are obtained by grinding the dry reaction product in slightly polar solvents at temperatures of from −10° C. to at most 50° C. In contrast, U.S. Pat. No. 4,895,948 and U.S. Pat. No. 4,895,949 disclose methods that are suitable for quinacridones, wherein a strongly alkaline, aqueous alcohol is used at from 20° C. to 40° C. According to U.S. Pat. No. 4,922,101, it is possible to proceed in the same manner for diketopyrrolopyrroles, in which case the temperature is likewise below 50° C. In contrast, according to WO-A-99/54410, treating pre-ground copper phthalocyanine in a strongly alkaline, aqueous alcohol results in a phase transformation.

On the other hand, in order to avoid dust formation, U.S. Pat. No. 5,318,627 uses water or solvents (including polar solvents) both for grinding and for optional subsequent after-treatment of crude carbazoledioxazine (a crude material known to be especially coarse and hard), although the examples are confined to water, diethylene glycol and, especially, isobutanol. In EP-A-0 971 001, quinacridones are ground in an organic solvent (including, for example, dimethylformamide) and then, optionally, subjected to after-treatment also in an organic solvent at from 50 to 200° C.

Example 9 of U.S. Pat. No. 3,256,285 discloses the treatment of an aqueous press cake of 2,9-diphenoxy-quinacridone with ethanol at 150° C. under pressure. The ratio of water to ethanol is 43:57. Identical results are also said to be obtained using N-methylacetamide. In neutral water, according to U.S. Pat. No. 3,287,147, solid solutions of quinacridones are also obtained at from 150° C. to 300° C. Analogously, in Example 12 of U.S. Pat. No. 5,428,136, a wet azo pigment press cake is treated with a mixture of isobutanol and water at 150° C. U.S. Pat. No. 5,756,691 discloses the subsequent treatment of a further wet azo pigment in a large excess of N-methylpyrrolidone at 130° C. On the other hand, according to U.S. Pat. No. 6,191,263, treating a calcium azo lake pigment with 30.8% to 20.4% (decreasing concentration) N-methylpyrrolidone in water at 90° C. results in a change in the crystalline form. In U.S. Pat. No. 4,024,148, a water-insoluble, hydroxyl-containing solvent is used under reflux.

In numerous methods, pigments are first dissolved to produce clear solutions, for example in concentrated sulfuric acid or a polar solvent such as dimethylformamide, dimethyl sulfoxide or N-methylpyrrolidone with the addition of a small amount of a strong alkali (at most 20% water, based on the liquid phase). The solution of colorant is then diluted with dilute acid, water or an alcohol or is added thereto, the crystalline form obtained being critically dependent upon the precise precipitation conditions. For example, quinacridones (U.S. Pat No. 4,247,696, JP-A-54/130621, JP-A-58/147461), and also azos and thioindigos (U.S. Pat. No. 4,734,137) as well as diketopyrrolopyrroles (U.S. Pat. No. 5,565,578, EP-B-0 737 723) can be treated in that manner.

All these methods are, for various reasons, not entirely satisfactory; moreover, such methods can be transferred from one pigment to another only with difficulty. In the case of multifunctional pigment plants, that results in high investment costs, a high personnel requirement, a lack of operational flexibility and extremely complex and costly quality assurance measures.

Some of those problems can be avoided by subjecting the dry crude pigments to salt kneading in a separate system with the addition of a small amount of solvent. The procedure is, however, slow, noisy and very energy-consuming. In addition, because of the very high frictional energy, it is necessary to monitor continuously the temperature (with a great deal of cooling) and the viscosity of the paste and, subsequently, solvent-containing brine must be disposed of in an environmentally friendly manner. In addition, further purification steps are necessary to achieve the low conductivity required, for example, for electronic applications.

There has now been found, surprisingly, a simple conditioning method which can be used for very many organic pigments and which ensures a considerable increase in productivity together with a very high quality of final product.

The invention accordingly relates to a method for the preparation of a conditioned pigment, wherein (1) the pigment is so synthesised that it precipitates from a liquid reaction mixture, and a pigment suspension is formed in the liquid reaction medium;

(2) optionally, the concentration of pigment in the pigment suspension is increased by removing part of the liquid reaction medium;

(3) optionally, a washing agent is added once or more than once and then the concentration of pigment in the pigment suspension is increased by removing part of the liquid phase;

(4) the pigment suspension from step (1), the concentrated pigment suspension from step (2), or the pigment suspension (treated with a washing agent and concentrated) from step (3), the liquid phase of which consists substantially of water, a neutral, polar liquid or a mixture thereof, is transferred into a storage vessel, optionally with addition of water or a neutral, polar liquid having a dipole moment $\mu$ of $2.8$–$6.0 \cdot 10^{-18}$ esu, keeping the pigment surface substantially wetted with liquid reaction medium, washing agent, polar liquid or water all the time;

(5) if the liquid phase of the pigment suspension in the storage vessel does not already consist of water and a neutral, polar liquid, the amount of neutral, polar liquid being from 1 to 30% by weight, based on the total amount of liquid and water, the composition of the pigment suspension is so modified by means of the addition of water or neutral, polar liquid having a dipole moment $\mu$ of $2.8$–$6.0 \cdot 10^{-18}$ esu that the amount of neutral, polar liquid is from 1 to 30% by weight, based on the total amount of liquid and water;

(6) the pigment suspension from the storage vessel is passed a number of times through an agitated media pearl mill in a circulating or shuttle mode of operation, the agitated media pearl mill having a smaller chamber volume than the volume of the pigment suspension and being operated at a specific power density of at most 2.0 kj·s$^{-1}$ per liter of grinding space;

(7) optionally, the concentration of pigment in the pigment suspension from the agitated media pearl mill is increased by removing part of the liquid reaction medium;

(8) optionally, a washing agent is added once or more than once to the pigment suspension from step (6) or (7) and then the concentration of pigment in the pigment suspension is increased by removing part of the liquid phase; and (9) the pigment is isolated by removing the liquid surrounding it.

Step (1) corresponds to pigment synthesis known per se to the person skilled in the art but stopped at the point where the reaction is complete. Subsequent maturation may optionally be carried out, for example in order to increase filterability, but that should be carried out under mild conditions so that the pigment particles do not become too large. Generally, the average size of non-agglomerated primary particles, viewed with an electron microscope, should be from 0.01 to 3 μm, preferably from 0.05 to 2 μm. It is essential to the invention, at any rate, that the pigment particles are generally not dried; otherwise, they aggregate and the desired result cannot be achieved or is achieved too slowly.

Although not desirable, it is, exceptionally, possible to use a dried pigment in the case of very coarse pigments that have only a very slight tendency to aggregate and are easy to wet with water or a polar solvent, for example crude pigments having a specific surface area of from 1 to 25 m$^2$/g, especially from 2 to 15 m$^2$/g. Dried pigments preferably still comprise a residual amount of water or a neutral, polar liquid, for example from 0.1 to 20% by weight, most preferably from 1 to 10% by weight. Apart of the additional drying and wetting steps, however, this procedure is in all particulars similar to that described above and the same preferences do apply.

Increasing the concentration of pigment in the pigment suspension in steps (2), (3), (7) and/or (8) can be carried out by methods known per se, for example filtration, dialysis or sedimentation with removal of liquid from the clear phase, optionally under increased gravity. 'Part' is to be understood as an amount of from 1 to 99% by weight, usually from 1 to about 90% by weight.

Washing agents suitable for step (3) will be known to the person skilled in the art from the relevant synthesis methods for the pigment used. They are, for example, water, brine, bicarbonate solution or any desired organic solvent, alone or in admixture or in any desired order. The purpose of such washing is to remove unreacted starting materials, reagents and by-products, especially acids, bases and coloured by-products. If filtration is used in step (2), it is especially efficient and advantageous to rinse the wet filter cake with washing agent. It is of course also possible first to redisperse the filter cake in the washing agent and only then to filter again.

The pigment suspension can be transferred to the storage vessel by methods known per se, which will depend on the consistency of the pigment suspension. A low-viscosity pigment suspension can, for example, be pumped, a solid press cake can be transferred by scooping or tipping, and a viscous paste by flushing with water or solvent. A particular aspect of the invention relates to transferring the pigment suspension in the form of a press cake consisting of from 10 to 50% by weight pigment and from 50 to 90% by weight liquid, preferably from 20 to 40% by weight pigment and from 60 to 80% by weight liquid. In that case the liquid is a neutral polar liquid having a dipole moment $\mu$ of $2.8$–$6.0 \cdot 10^{-18}$ esu, water or a mixture thereof, preferably water.

Step (5) specifies suitably modifying, when necessary, the ratio of water to neutral, polar liquid before passage through the agitated media pearl mill. If a neutral, polar liquid having a dipole moment $\mu$ of $2.8$–$6.0 \cdot 10^{-18}$ esu (2.8 to 6.0 debye units) is added in step (5), that is carried out preferably before step (6) is started. It is also, however, perfectly possible to add all or some of the neutral, polar liquid to the pigment suspension only after one or more passes through the agitated media pearl mill, although the treatment time will be needlessly extended as a result.

The treatment of the pigment suspension in the agitated media pearl mill is an essential step of the invention. The friction must not be too high; otherwise, pigment particles that are obtained will be too small as a result of the grinding action. Conversely, the speed must not be too low; otherwise, the dispersive force will be insufficient to separate any agglomerations present into their primary particles. It has been found that the specific power density should be at most 2.0 kj·s$^{-1}$ per liter of grinding space and the peripheral speed of the agitator should then be from 5 to 12 m·s$^{-1}$, preferably from 6 to 11 m·s$^{-1}$. Higher peripheral speeds of up to about 15 m·s$^{-1}$ (perhaps even higher in the future) are possible with some special apparatus, but only if achievable at a specific power density of at most 2.0 kj·s$^{-1}$ per liter of grinding space.

The temperature is advantageously in the range between the freezing point and the boiling point of the mixture of water and polar liquid, preferably from 20 to 80° C., especially from 50 to 80° C. An especially preferred aspect of the invention relates to the use, under excess pressure, of a temperature of from 70 to 120° C., especially from 100 to 120° C. The temperature is advantageously adjusted in the storage vessel. Temperature control can be achieved especially conveniently in the temperature range from 50 to 80° C. because the heat of friction can be balanced, approximately, by the heat losses. Above that range, it is necessary to carry out heating; alternatively, however, a particular aspect of the invention relates to lowering the temperature in the course of grinding from the above-mentioned initial value to a value first of from 50 to 80° C. and then at the end of grinding from 20 to 50° C.

The agitated media pearl mill is a known apparatus, it merely being necessary to use a controller so that, at full power, it does not exceed the above-mentioned specific power density. Whilst taking that precaution, it is possible to use any desired apparatus, without requiring any special constructional measures because the heat of friction is not very great. In other regards, the operating instructions of the available apparatus should be consulted. As grinding elements there are used, for example, balls of from 0.1 to 1 mm in diameter made from zirconium oxide, mixed zirconium oxide, aluminium oxide, quartz or a metal such as steel, preferably mixed zirconium oxide balls having a diameter of from 0.2 to 0.3 mm.

The treatment period in the agitated media pearl mill is usually from 20 to 200 minutes (including dwell time in the storage vessel between individual passes), a longer treatment period having no significant effect on the properties of the product. As a result, the risk of overmilling can be excluded, with very great advantage for the meeting of specifications, especially if it is ensured that the radial speed of the mill is not too high; in the final phase of grinding (approximately the last third of the total grinding time), the radial speed should be cut back to a value of at most 11 $m \cdot s^{-1}$, preferably from 1 to 8 $m \cdot s^{-1}$, especially from 2 to 5 $m \cdot s^{-1}$.

In the case of a shuttle mode of operation, a plurality of storage vessels is used, for example from 2 to 20 storage vessels, the suspension being passed from one storage vessel to another storage vessel via the agitated media pearl mill.

Passing pigment suspension through a number of times in a circulating or shuttle mode of operation is understood to mean that the volume passed through is at least twice as great as the volume of the pigment suspension, which in the shuttle mode of operation corresponds to passing through approximately twice. The maximum value is arbitrary, although the use of more than one hundred passes, for example one thousand passes, whilst possible, is of little advantage because it has no significant effect on the properties of the product. Circulating and shuttle modes of operation can also be combined with one another, for example grinding first in a circulating mode of operation and then in a shuttle mode of operation and vice versa.

In principle, the washing agents used in step (8) can be the same as in step (3). Because the conditioning according to the invention is carried out substantially under neutral conditions, it is necessary to remove, at most, very small amounts of acid or base. Moreover, once step (3) has been carried out, most of the unreacted starting materials, reagents and by-products will already have been removed so that smaller amounts of polar solvents, for example alcohols and, preferably, water, can be used for the washing.

Isolation of the pigment is carried out by any desired known method. For example, it is possible to carry out filtration or centrifugation and then to dry the moist material in an oven or fluidised-bed apparatus (for example at from 50 to 250° C., optionally in vacuo), or to freeze-dry it. It is likewise possible to spray-dry the pigment suspension directly. The conditioned pigment is usually obtained in the form of a powder, which can, if desired, be dry-ground and sieved or treated by any other desired physical method.

The neutral, polar liquid advantageously has a dipole moment 1 of $2.8-6.0 \cdot 10^{-18}$ esu, measured in benzene at 25° C., preferably $3.3-5.5 \cdot 10^{-18}$ esu, especially $3.8-5.0 \cdot 10^{-18}$ esu. The liquid should also be inert with respect to the pigment and to water at temperatures up to 100° C. and also, in the concentration used and in the temperature range used, should dissolve in water to give a clear solution, although that is virtually always the case. Suitable neutral polar liquids are, for example, acetamide, formamide, methylacetamide, methylformamide, caprolactam, valerolactam, 1,1,2,2-tetramethylurea, dimethyl sulfoxide, sulfolane, nitromethane, nitrobenzene, acetonitrile, methanol, ethylene carbonate, dimethylacetamide, dimethylformamide and N-methylpyrrolidone, preferably dimethyl sulfoxide (DMSO), dimethylformamide (DMF) or N-methylpyrrolidone (NMP), especially N-methylpyrrolidone.

Of course, slight molecular modifications of the above-mentioned liquids are possible (for example, replacement of methyl groups by ethyl groups) provided that their polarity remains suitable as a result. Optionally, it is also possible to use mixtures of a plurality of neutral liquids, the overall polarity of which lies in the specified range of $2.8-6.0 \cdot 10^{-18}$ esu (the overall polarity of a mixture of polar liquids, where applicable, should be calculated from the dipole moments of the components in proportion to the relative amounts thereof in the mixture).

The expression "liquid" is used herein because the pigments are, under neutral conditions, poorly soluble therein and therefore the usual term "solvent" would be functionally incorrect.

The amount of neutral, polar liquid is advantageously from 1 to 30% by weight, based on the total amount of liquid and water. Preference is generally given to an amount of liquid of from 3 to 20% by weight, especially from 5 to 10% by weight. For pigments having more than negligible solubility in water (from 10 to 300 mg/l—for example, laked azo pigments), the recommended amount of liquid is, however, from 0.5 to 10% by weight. For colorants of still higher solubility in water, the method is less suitable.

In addition, it is possible to use small amounts of additional substances, for example acids, bases, resins, growth inhibitors and, especially, dispersing agents or wetting agents. The amount of acid or base should, however, be at most 0.01 mol, especially at most 0.001 mol, based on 1 mol of water. Resins are added in amounts of up to, at most, 10% by weight, preferably at most 5% by weight, especially 1% by weight, based on the pigment. Growth inhibitors and dispersing agents will be known to the person skilled in the art and may be, for example, substances having structural elements of the pigment; they are usually used in amounts of at most 0.03 mol, based on 1 mol of pigment. Wetting agents, for example cationic, anionic, amphoteric or non-ionic wetting agents, can likewise be added in customary amounts. Preference is given, in that case, to the addition of from 0.2 to 5% by weight, especially from 0.5 to 3% by weight, based on the pigment, of an amphoteric wetting agent. Additional substances can suitably be added in any step (1), (2), (3), (4), (5), (6), (7) or (8), preferably in step (6), (7) or (8), with particular preference in step (6), especially after two-third of the total duration of step (6).

A major advantage of the invention is that no solid salts are necessary. Although it is possible to add salts (for example sodium chloride or sodium sulfate) up to the saturation limit in the aqueous liquid, that does not bring about any advantages but, on the contrary, only gives rise to additional problems in recovering the liquid.

The method can be performed in the presence of air. In the case of oxidisable pigments, for example quinacridones, it is, however, advantageously possible, if desired, to create inert conditions very simply using nitrogen, carbon dioxide or a noble gas.

It is self-evident that, for the purpose of recycling, the neutral, polar liquid used can be recovered by methods known per se, for example by distillation.

In contrast to other conditioning methods, for example kneading, the viscosity plays a rather subordinate role. It is necessary, however, to select a viscosity range that is suitable for the apparatus used, for example from $5 \cdot 10^{-2}$ Pa·s to 5 Pa·s, preferably from $10^{-1}$ Pa·s to $5 \cdot 10^{-1}$ Pa·s (at 500 s$^{-1}$). The person skilled in the art will know, or can determine by simple means known to him, how the viscosity depends upon the temperature, the liquid selected and the concentration thereof, and upon the concentration and particle shape of the pigment being conditioned.

The amount of crude pigment is usually, in step (6), from 1 to 25% by weight, preferably from 2 to 20% by weight, especially from 5 to 15% by weight, based on the total amount of crude pigment, liquid and water (including water or liquid in the press cake), it being necessary of course for the amount of crude pigment to be calculated from the crude pigment content of the press cake because the press cake should not be dried. The amount of crude pigment in a press cake is usually from 10 to 50% by weight, preferably from 20 to 40% by weight, based on the wet press cake.

The crude pigments can be individual chemical compounds but, depending on the desired result, it is also possible to use mixtures of a plurality of chemical compounds or even solid solutions or mixed crystals comprising a plurality of chemical compounds, preferably quinacridones and/or diketopyrrolopyrroles, optionally in combination with derivatives thereof. In the selection of components and the amounts thereof, the person skilled in the art will be guided by solid solutions or mixed crystals that are known per se or to be expected on the basis of the state of the art.

The shuttle mode of operation is especially well suited to the preparation of pigment mixtures, for example standardisations of different batches of the same pigment or formulations of a plurality of pigments. The number of storage vessels is, in such a case, preferably one more than the number of components to be mixed, which makes it possible for the treatment period to be matched to the characteristics of the different components. The person skilled in the art will immediately recognise the great advantages of this method.

Pigments are, for example, from the 1-aminoanthraquinone, anthanthrone, anthrapyrimidine, azo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone or thioindigo series, optionally also in the form of metal complexes or metal lakes. The azos may, for example, be mono- or dis-azo pigments of all known sub-classes, obtainable, for example, by coupling, condensation or laking.

Pigments conditionable according to the invention are, for example, Colour Index Pigment Yellow 24, 108, 109, 110, 123, 147, 173, 193, 199, Pigment Orange 40, 43, 48, 49, 51, 61, 71, 73, Pigment Red 88, 89, 122, 149, 168, 177, 178, 179, 181, 190, 192, 194, 202, 204, 206, 207, 209, 216, 224, 226, 254, 255, 262, 264, 270, 272, Pigment Violet 19, 23, 29, 31, 37, 42, Pigment Blue 15, 15:1, 15:2, 15:3, 15:4, 15:6, 16, 60, 64, Pigment Green 7, 36, Pigment Black 31, 32, Vat Red 74, 3,6-di(3'-cyano-phenyl)-2,5-dihydro-pyrrolo[3,4-c]pyrrole-1,4-dione or 3-phenyl-6-(4'-tert-butyl-phenyl)-2,5-dihydro-pyrrolo[3,4-c]pyrrole-1,4-dione.

Preference is given to pigments that do not contain metals. Special preference is given to polycyclic pigments, including, especially, quinacridones and dioxazines, and also diketopyrrolopyrroles, very especially diketopyrrolopyrroles; quinacridones being prepared preferably by oxidation of dihydroquinacridones using hydrogen peroxide, for example as described in U.S. Pat. No. 5,840,901 or U.S. application Ser. No. 60/277,824.

The pigments obtained in accordance with the invention have a high degree of crystallinity and optimum fastness properties, as well as high colour strength and colour saturation. Moreover, the particle size distribution is astonishingly narrow. In the case of the preferred average particle size of the conditioned pigment $\overline{L}$ of preferably from 0.01 to 3 μm, especially from 0.05 to 2 μm, at least 90% by weight of particles have a size of $\overline{L}\pm\frac{1}{2}\overline{L}$ (for example, in the case of an average particle size of 0.2 μm, 0.2±0.1 μm=0.1 to 0.3 μm). Especially, at least 80% by weight of particles have a size of $\overline{L}\pm\frac{1}{4}\overline{L}$.

A further advantage of the invention is that the crystalline phase remains substantially unchanged, meaning that the crystalline form identifiable as the main component in the crude product based on the X-ray powder diagram is also identifiable as the main component in the end product based on the X-ray powder diagram. Generally, when a crude product consists of a mixture of crystalline forms, the proportion of the main crystalline form is even increased. Preference is given to carrying out the method at least until the pigment consists of a single uniform crystalline form. Depending upon the crude pigment, that may be a pure phase, or a solid solution or a mixed crystal.

The pigments obtained according to the invention can be used for all customary purposes, for example for masscoloration of polymers, including polymers in the form of fibres, surface-coatings (including special-effect paints, including those for the automobile sector) and printing inks, or also in so-called resists or as toners. Such applications will be so evident to the person skilled in the art that they need not be listed here. They are also disclosed in reference works, for example "Industrielle Organische Pigmente" (W. Herbst+K. Hunger, VCH Weinheim/New York, new editions being continually published in German and English).

It is also advantageously possible to prepare both transparent and hiding forms. Especially advantageous is the preparation of hiding pigments, which in contrast to known methods does surprisingly not require an acid, base and/or solvent treatment.

The hiding power is suitably measured at in a 25±5 μm thick acrylic or polyester enamel coating system having a pigment to binder weight ratio of 0.18 over a black and white background and prepared and measured according to established industry procedures such as disclosed in Example 28. For a hiding pigment, the color difference ΔE* measured over a black and white background should be less or equal to 15, preferably ≦10, most preferably ≦5.

Transparent pigments generally have a particle size (length) of 0.001–0.3 μm, preferably 0.01–0.2 μm, most preferably combined with the narrow particle size distribution mentioned above. In the same coating as above, the color difference ΔE* measured over a black background is advantageously less or equal to 15, preferably ≦10, most preferably ≦5, as compared with the color of the black background itself.

It has furthermore been found, that pigments conditioned in accordance with the invention are of such outstanding quality that they may frequently come into consideration for applications where the qualities obtainable hitherto for the same pigment have not been entirely satisfactory. The person skilled in the art is here expressly recommended to carry out appropriate experiments.

The Examples that follow illustrate the invention, without limiting the scope thereof (unless otherwise specified, "%" is always % by weight):

EXAMPLE 1

Pigment Red 255 is prepared in accordance with Example 1 of U.S. Pat. No. 4,579,959, but without drying after the washing water has become colourless. In a slurrying vessel made inert with nitrogen, 30 parts by weight of the crude pigment press cake, which is damp with water (40% by weight solids content, 60% by weight water), are dispersed, with stirring, using 9 parts by weight of N-methylpyrrolidone and 81 parts by weight of water for 30 minutes and heated to 74° C. The resulting suspension, consisting of 10% by weight crude pigment, 7.5% by weight N-methylpyrrolidone and 82.5% by weight water, is circulated through a cylindrical wet mill (volume corresponding to 24 parts by weight of water) filled to about 80% of its volume with mixed zirconium oxide grinding elements from 0.3 to 0.4 mm in diameter, at a radial speed of 11 m·s$^{-1}$ and a nominal power output of 1.83 kj·s$^{-1}$ (net power output 1.33 kj·s$^{-1}$) for 30 minutes at constant temperature. The suspension is then filtered under suction and washed four times, using 60 parts by weight of water each time. The filtration residue is dried at 87° C./7.1·10$^3$ Pa for 17½ hours and is then grated into small granules using a Frewitt apparatus. 12 parts by weight of Pigment Red 255 having a narrow particle size distribution and excellent application properties are obtained.

EXAMPLE 2

The procedure is analogous to Example 1, but treatment with the wet mill is shortened to 20 minutes. The result is very similar to that in Example 1.

EXAMPLE 3

The procedure is analogous to Example 1, but treatment with the wet mill is extended to 180 minutes. The result is very similar to that in Example 1.

EXAMPLE 4

The procedure is analogous to Example 1, but with a temperature of 54° C. and a radial speed of 10 m·s$^{-1}$ in the wet mill. The result is very similar to that in Example 1.

EXAMPLE 5

The procedure is analogous to Example 4, but treatment with the wet mill is extended to 60 minutes. The result is very similar.

EXAMPLE 6

Pigment Violet 19 is prepared in accordance with Example 1 of U.S. Pat. No. 5,840,901, but without drying after washing with warm water. Using water, a portion of the wet press cake containing 33.33 g of γ-quinacridone is flushed into a storage vessel and slurried (total weight of the suspension: 400 g). Pigment Red 202 is prepared in accordance with Example 3 of U.S. Pat. No. 5,840,901, but without drying after washing with warm water. Using water, a portion of the wet press cake containing 66.67 g of 2,9-dichloroquinacridone is flushed into a storage vessel and slurried (total weight of the suspension: 600 g). Both storage vessels are heated to 35° C. The γ-quinacridone is then passed, via a cylindrical wet mill (volume corresponding to 24 parts by weight of water), filled to about 80% of its volume with mixed zirconium oxide grinding elements from 0.3 to 0.4 mm in diameter, at a radial speed of 10 m·s$^{-1}$, into the 2,9-dichloroquinacridone suspension, and the mixture is passed back and forth between the two storage vessels in a shuttle mode of operation for 1 hour. The first storage vessel is then rinsed with 120 g of N-methylpyrrolidone and a circulating mode of operation is carried out using the second storage vessel for a further 1 hour at a radial speed of 13.5 m·s$^{-1}$ and a temperature of 95° C. The radial speed is then reduced to 4.0 m·s$^{-1}$ and the suspension is ground for a further 1 hour in circulating mode. The product is then filtered and washed and dried in customary manner. A quinacridone pigment having a narrow particle size distribution and excellent application properties is obtained.

EXAMPLE 7

1.000 kg of crude Pigment Violet 23 (needles of about length 3 μm and thickness 0.2 μm) is stirred in 8.500 kg of water for 2 hours and then, analogously to the Examples above, transferred to a storage vessel using 0.060 kg of N-methylpyrrolidone and heated to 70° C. The suspension is circulated through a cylindrical wet mill (volume 460 cm$^3$), filled to about 85% of its volume with yttrium-stabilised mixed zirconium oxide grinding elements from 0.3 to 0.4 mm in diameter, at a radial speed of 12 m·s$^{-1}$ (speed of rotation 3000 rpm) and a nominal power output of 0.50 kj·s$^{-1}$ for 6 hours at constant temperature. The nominal power output is reduced to 0.1 kj·s$^{-1}$ (speed of rotation 1800 rpm) and the temperature is lowered to 25° C. over the course of 1 hour. The suspension is filtered under suction and washed twice, using 2.0 kg of water each time; the product is dried at 80° C./2·10$^3$ Pa. A fine, strongly coloured dioxazine pigment having a narrow particle size distribution and good application properties is obtained.

EXAMPLE 8

The procedure is analogous to Example 7, but 0.900 kg of water and 0.180 kg of N-methylpyrrolidone are used. Likewise, a fine, strongly coloured dioxazine pigment is obtained.

EXAMPLE 9

Pigment Red 202 is prepared in accordance with Example 3 of U.S. Pat. No. 5,840,901, but without drying after washing with warm water. Using water, a portion of the wet press cake containing 100.0 g of 2,9-dichloroquinacridone is flushed into a storage vessel and slurried (total weight of the suspension: 1000 g). The storage vessel is heated to 35° C. The suspension is then passed, via a cylindrical wet mill (volume corresponding to 24 parts by weight of water), filled to about 80% of its volume with mixed zirconium oxide grinding elements from 0.3 to 0.4 mm in diameter, at a radial speed of 10 m·s$^{-1}$, into another, empty storage vessel, and the mixture is passed back and forth between the two storage vessels in a shuttle mode of operation for 1 hour. The first storage vessel is then rinsed with 120 g of N-methylpyrrolidone and a circulating mode of operation is carried out using the second storage vessel for a further 1 hour at a radial speed of 13.5 m·s$^{-1}$ and a temperature of 95° C. The radial speed is then reduced to 4.0 m·s$^{-1}$ and the suspension is ground for a further 1 hour in circulating mode. The product is then filtered and washed and dried in customary manner. A quinacridone pigment having a narrow particle size distribution and excellent application properties is obtained.

EXAMPLE 10

The procedure is analogous to Example 7, but a mixture of 0.750 Kg crude 2,9-dichloroquinacridone and 0.250 Kg crude unsubstituted quinacridone (both obtained as coarse particles of specific surface area about 10 m$^2$/g by oxydation of the corresponding 6,11-dihydroquinacridones) is used instead of Pigment Violet 23. The isolated product shows excellent application properties.

EXAMPLE 11

The procedure is analogous to Example 10, but 180 g of alum followed by 27.5 g of quinacridone sulfonic acid are added from 30 min to 20 min before end of milling, leading to precipitation of aluminium quinacridone monosulfonate onto the pigment's surface. The isolated product shows excellent application properties.

EXAMPLE 12

The procedure is analogous to Example 1, but instead of Pigment Red 255, the moist washed press cake of the solid solution of quinacridone obtained in example 1 of EP 0 894 832 A2 (page 7/line 15) is used and dispersed into a solution composed of 81% of water and 9% of N-methyl-pyrrolidone. The temperature and milling conditions are as in Example 1. The isolated product has a very narrow particle size distribution and shows excellent application properties.

EXAMPLES 13–27

The procedure is analogous to Example 11, but the solid solution of quinacridone obtained in example 1 of EP 0 894 832 A2 is replaced by the moist press cakes obtained in Examples 1, 2, 3, 4, 5, 6, 7, 8, 9, 11, 12, 13, 14, 15 and 16 of EP 0 643 110 A1. The isolated products have excellent application properties.

EXAMPLE 28

The pigment according to Example 1 is incorporated into an automotive polyester/CAB enamel paint system.
(a) Binder solution (8.2% Binder):
41.0 CAB® 531.1 (Eastman Chem.), 20% in butyl acetate/xylene 2:1
1.5 NUODEX® 6 (zirkonium octoate, Nordmann, Rassmann, D-Hamburg)
18.5 Solvesso® 150 (Exxon)
21.5 butyl acetate
17.5 xylene
(b) Millbase Formulation:
A 250 ml jar is charged with 15.73 g Dynapol® H 700-08 (Degussa-Hüls), 11.80 g of the freshly prepared binder solution from (a), 11.80 g Maprenal® MF 650 (Vianova Resins) and 2.67 g dispersant Disperbyk® 161 (BYK Chemie). 8 g pigment according to Example 1 and 100 g of glass beads are added. The mixture in the jar is shaken on a Skandex shaker for 1 hour. The millbase contains 16.0% pigment with a pigment/binder ratio of 1:2.25 and a solids (pigment+binder) content of 59%.
(c) Masstone Color for an PES/CAB Enamel Drawdown:
23.75 g of the millbase from (b), 10.50 g of Dynapol® H 700-08, 7.87 g of the binder solution from (a) and 7.87 g Maprenal® MF 650 are mixed, yielding a resin/pigment dispersion with a concentration of 7.6% pigment in a pigment to binder ratio of 1:5.22 and a solid (pigment+binder) content of 47.3%.
(d) Coating:
The resin/pigment dispersion is drawn down onto a Leneta black and white chart from the Leneta Company using a 100 μm wet film applicator. The film is flashed in a flash cabinet for 30 minutes and then "baked" in an oven at 130° C. for 30 minutes. The final thickness of the coating is 28 μm.
(e) Colour Measurement:
The C.I.E. L*, C*, h color space values are obtained from the portion over white background using a $D_{65}$ illuminant and 10° observer with a specular component included.

EXAMPLES 29–54

The procedure is analogous to Example 28 (a)–(e), but the pigment of Example 1 is replaced by the pigments of Examples 2–27.

What is claimed is:
1. A method for the preparation of a conditioned organic pigment, comprising the steps wherein
   (1) a pigment suspension is formed through synthesis of an organic pigment in a liquid reaction medium and precipitation of the thus synthesized pigment from said liquid reaction medium;
   (2) the pigment suspension from step (1) is transferred into a storage vessel, keeping the pigment surface substantially wetted throughout the transfer with said liquid reaction medium, a washing agent, a polar liquid or water;
   (3) if the liquid medium of the pigment suspension in the storage vessel does not already consist of water and from 1 to 30% by weight of a neutral, polar liquid, based on the total amount of liquid and water, the composition of the pigment suspension is so modified by means of the addition of water and/or neutral, polar liquid having a dipole moment $\mu$ of 2.8–6.0·10$^{-18}$ esu so that the amount of neutral, polar liquid is from 1 to 30% by weight, based on the total amount of liquid and water;
   (4) the pigment suspension from the storage vessel is passed a number of times through an agitated media pearl mill having a radial speed in a circulating or shuttle mode of operation, the agitated media pearl mill having a smaller chamber volume than the volume of the pigment suspension and being operated at a specific power density of at most 2.0 kJ·s$^{-1}$ per liter of grinding space;
   (5) the pigment is isolated by removing the liquid surrounding it.
2. A method for the preparation of a conditioned organic pigment according to claim 1, further comprising one or more steps selected from the group consisting of
   increasing the concentration of pigment in the pigment suspension after step (1) and before step (5) by removing part of the liquid reaction medium;
   adding a washing agent to the pigment suspension after step (1) and before step (5); and adding one or more additional substances selected from the group consisting of acids, bases, resins, growth inhibitors, dispersing agents, and wetting agents during any step prior to step 5.

3. A method according to claim 1 wherein the neutral, polar liquid has a dipole moment $\mu$ of 3.3–5.5·10$^{-18}$ esu.

4. A method according to claim 1, wherein the neutral, polar liquid is one or more compounds selected from the group consisting of acetamide, formamide, methylacetamide, methylformamide, caprolactam, valerolactam, 1,1,2,2-tetramethylurea, dimethyl sulfoxide, sulfolane, nitromethane, nitrobenzene, acetonitrile, methanol, ethylene carbonate, dimethylacetamide, dimethylformamide and N-methylpyrrolidone.

5. A method according to claim 1, wherein the amount of neutral, polar liquid is from 3 to 20% by weight based on the total amount of liquid and water.

6. A method according to claim 1, wherein the pigment is a quinacridone, dioxazine or diketopyrrolopyrrole pigment.

7. A method according to claim 1, wherein the total treatment period in the agitated media pearl mill is from 20 to 200 minutes.

8. A method according to claim 7, wherein after two-thirds of the total treatment period, the radial speed is adjusted to a value of at most 11 m·s$^{-1}$.

9. A method according to claim 1, wherein the pigment obtained in step (5) consists of at least 90% by weight of particles having a size of $L\pm\frac{1}{2}\overline{L}$, wherein the average particle size $\overline{L}$ is from 0.01 to 3 $\mu$m.

10. A method according to claim 1, wherein the pigment obtained in step (5) has hiding power leading to a color difference $\Delta E^*$ less or equal to 15, as measured in a 25±5 $\mu$m thick acrylic or polyester enamel coating system having a pigment to binder weight ratio of 0.18 over a black and white background.

11. A method according to claim 1, wherein the pigment obtained in step (5) is transparent and has a particle size of 0.001–0.3 $\mu$m.

12. A method according to claim 1, wherein the pigment is a diketopyrrolopyrrole pigment.

13. A method according to claim 1 wherein the neutral, polar liquid has a dipole moment $\mu$ of 3.8–5.0·10$^{-18}$ esu.

14. A method according to claim 7, wherein after two-thirds of the total treatment period, the radial speed is adjusted to a value of from 1 to 8 m·s$^{-1}$.

15. A method according to claim 7, wherein after two-thirds of the total treatment period, the radial speed is adjusted to a value of from 2 to 5 m·s$^{-1}$.

16. A method according to claim 1, wherein the pigment obtained in step (5) has hiding power leading to a color difference $\Delta E^*$ less or equal to 10, as measured in a 25±5 $\mu$m thick acrylic or polyester enamel coating system having a pigment to binder weight ratio of 0.18 over a black and white background.

17. A method according to claim 1, wherein the pigment obtained in step (5) has hiding power leading to a color difference $\Delta E^*$ less or equal to 5, as measured in a 25±5 $\mu$m thick acrylic or polyester enamel coating system having a pigment to binder weight ratio of 0.18 over a black and white background.

18. A method for the preparation of a conditioned organic pigment comprising the steps wherein (1) a pigment suspension is formed through synthesis of an organic pigment in a liquid reaction medium and precipitation of the thus synthesized pigment from said liquid reaction medium;

(2) the pigment from step (1) is filtered and optionally washed to form a press cake;

(3) the press cake from step (2) is dried to form a crude pigment having a specific surface area of from 1 to 25 m$^2$/g, the dried crude pigment optionally still comprising a residual amount of water and/or a neutral, polar liquid;

(4) the crude pigment from step (3) is transferred into a storage vessel and wetted with addition of water and/or a neutral, polar liquid having a dipole moment $\mu$ of 2.8–6.0·10$^{-18}$ esu;

(5) if the liquid phase of the pigment suspension in the storage vessel does not already consist of water and from 1 to 30% by weight of a neutral, polar liquid, based on the total amount of liquid and water, the composition of the pigment suspension is so modified by means of the addition of water and/or neutral, polar liquid having a dipole moment $\mu$ of 2.8–6.0·10$^{-18}$ esu so that the amount of neutral, polar liquid is from 1 to 30% by weight, based on the total amount of liquid and water;

(6) the pigment suspension from the storage is passed a number of times through an agitated media pearl mill having a radial speed in a circulating or shuttle mode of operation, the agitated media pearl mill having a smaller chamber volume than the volume of the pigment suspension and being operated at a specific power density of at most 2.0 kJ·s$^{-1}$ per liter of grinding space;

(7) the pigment is isolated by removing the liquid surrounding it.

19. A method for the preparation of a conditioned organic pigment according to claim 18, further comprising one or more steps selected from the group consisting of adding a substance selected from the group consisting of acids, bases, resins, growth inhibitors, dispersing agents, and wetting agents during any step prior to step 7;

adding a washing agent to any pigment suspension obtained prior to step (7); and increasing the concentration of pigment in the pigment suspension by removing part of the liquid medium between steps (6) and (7) or after addition of a washing agent.

20. A method according to claim 18, wherein the neutral, polar liquid has a dipole moment $\mu$ of 3.3–5.5·10$^{-18}$ esu.

21. A method according to claim 18, wherein the neutral, polar liquid is one or more compounds selected from the group consisting of acetamide, formamide, methylacetamide, methylformamide, caprolactam, valerolactam, 1,1,2,2-tetramethylurea, dimethyl sulfoxide, sulfolane, nitromethane, nitrobenzene, acetonitrile, methanol, ethylene carbonate, dimethylacetamide, dimethylformamide and N-methylpyrrolidone.

22. A method according to claim 18, wherein the amount of neutral, polar liquid is from 3 to 20% by weight based on the total amount of liquid and water.

23. A method according to claim 18, wherein the pigment is a quinacridone, dioxazine or diketopyrrolopyrrole pigment.

24. A method according to claim 18, wherein the total treatment period In the agitated media pearl mill is from 20 to 200 minutes.

25. A method according to claim 24, wherein after two-thirds of the total treatment period, the radial speed is adjusted to a value of at most 11 m·s$^{-1}$.

26. A method according to claim 18, wherein the pigment obtained in step (7) pigment consists of at least 90% by weight of particles having a size of $L\pm\frac{1}{2}\overline{L}$, wherein the average particle size $\overline{L}$ s from 0.01 to 3 $\mu$m.

27. A method according to claim 18, wherein the pigment obtained in step (7) has hiding power leading to a color difference ΔE* less or equal to 15, as measured in a 25±5 μm thick acrylic or polyester enamel coating system having a pigment to binder weight ratio of 0.18 over a black and white background.

28. A method according to claim 18, wherein the pigment obtained in step (7) is transparent and has a particle size of 0.001–0.3 μm.

29. A method according to claim 18, wherein the pigment is a diketopyrrolopyrrole pigment.

30. A method to according to claim 18, wherein the neutral, polar liquid has a dipole moment $\mu$ of $3.8–5.0 \cdot 10^{-18}$ esu.

31. A method according to claim 24, wherein after two-thirds of the total treatment period, the radial speed is adjusted to a value of from 1 to 8 m·s$^{-1}$.

32. A method according to claim 24, wherein after two-thirds of the total treatment period, the radial speed is adjusted to a value of from 2 to 5 m·s$^{-1}$.

33. A method according to claim 18, wherein the pigment obtained in step (5) has hiding power leading to a color difference ΔE* less or equal to 10, as measured in a 25±5 μm thick acrylic or polyester enamel coating system having a pigment to binder weight ratio of 0.18 over a black and white background.

34. A method according to claim 18, wherein the pigment obtained in step (5) has hiding power leading to a color difference ΔE* less or equal to 5, as measured in a 25±5 μm thick acrylic or polyester enamel coating system having a pigment to binder weight ratio of 0.18 over a black and white background.

* * * * *